UNITED STATES PATENT OFFICE.

OSCAR SCHULTHESS, OF BERLIN, AND LEO KERKOVIUS, OF FRIEDENAU, NEAR BERLIN, GERMANY, ASSIGNORS TO ACTIEN GESELLSCHAFT FÜR ANILIN FABRIKATION, OF BERLIN, GERMANY.

AMIDO-OXY-SULFONIC ACID OF PHENYLNAPHTHIMIDAZOL AND PROCESS OF MAKING SAME.

No. 851,444.     Specification of Letters Patent.     Patented April 23, 1907.

Application filed November 13, 1905. Serial No. 287,204.

*To all whom it may concern:*

Be it known that we, OSCAR SCHULTHESS and LEO KERKOVIUS, citizens of the Swiss Republic and Russian Empire, respectively, residents, respectively, of Berlin and of Friedenau, near Berlin, in the Kingdom of Prussia, German Empire, have invented new and useful Improvements in Amido-Oxy-Sulfonic Acids of Phenylnaphthimidazol and Processes of Making the Same; and we do hereby declare that the following is a full, clear, and exact description thereof, which will enable others skilled in the art to which it appertains to make and use the same.

This invention relates to the manufacture of amidooxy-sulfonic acids of phenyl-1.2-naphthimidazol:

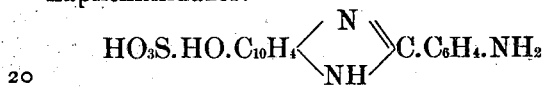

which acids have been found to be a valuable parent-material for the production of dye-stuffs. As we have found these acids may be prepared by melting an amidodisulfonic acid of the phenyl-1.2-naphthimidazol, as represented by the following formula:

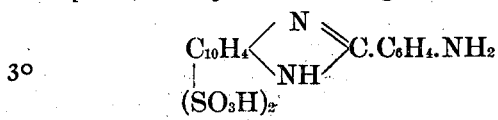

with a caustic alkili.

For the production of the above amido-disulfonic acids of phenyl-1.2-naphthimidazol which serve as a parent-material for our present invention, several methods are given. They may be prepared by the action of a nitro-benzaldehyd or of an amidobenzaldehyd or of a derivative thereof on 1.2-diamidonaphthalene-5.7-disulfonic ac d and converting the benzylidene-derivative formed, by heating with acids or acid reducing agents, into the naphthimidazol-derivative. As an example, when using nitrobenzaldehyd and an acid reducing agent the following formulæ illustrate the process:

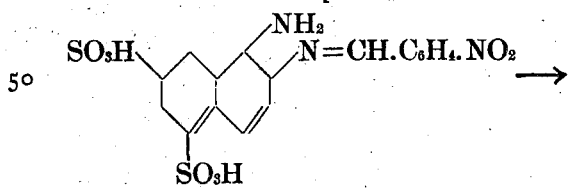

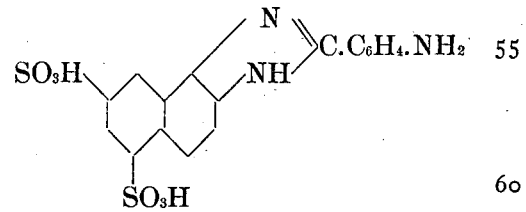

It is not necessary to isolate the 1.2-diamidonaphthalene-sulfonic acid; one can also directly use a solution of it which is obtained by reduc ng with a suitable agent a mono-azo-dyestuff which is prepared by the action of a suitable diazo-compound, for instance the diazo-compound of sulfanilic acid, in an acid solution on the 2-naphthylamin-5.7-disulfonic acid.

Another way to obtain the above amido-sulfonic acids of phenyl-1.2-naphthimidazol is the following: One prepares first a mono-azo-dyestuff for instance from the 2-naphthylamin-5.7-disulfonic acid by combining the respective sulfonic acid in an acid solution with a suitable diazo-compound, as for instance the diazo-compound of para-nitrani-lin. Thus is obtained for instance the following dyestuff:

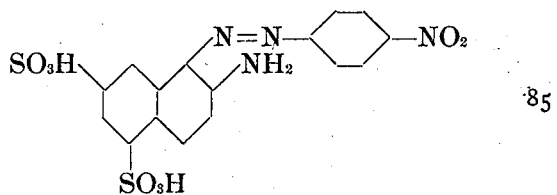

Now by acting on this dyestuff with a nitro-benzaldehyd at ordinary temperature one obtains the following compound:

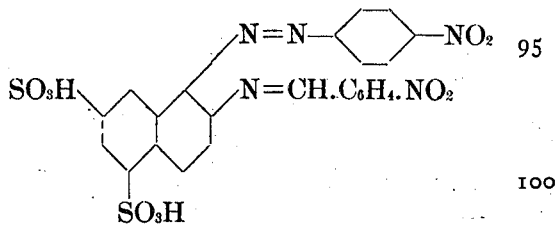

This product, in the presence of acids, is transformed at first into an uncolored triazin-derivative which when treated with a suitable reducing agent, such as stannous chlorid, in the heat is converted into the desired naphthimidazol-5.7-disulfonic acid:

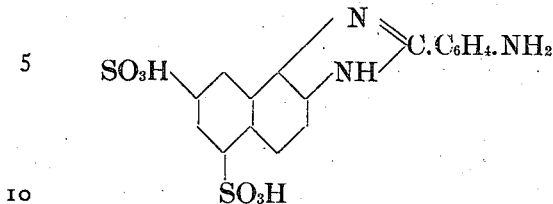

the reaction consisting in the formation of the naphthimidazol-ring whilst at the same time the residue of the para-nitranilin is eliminated in the form of para-phenylenediamin and the nitro-group of the residue of the benzaldehyd is reduced.

The following example may serve to illustrate our invention, the parts being by weight: 46 parts of the sodium salt of the meta-amidophenyl-1.2-naphthimidazol-5.7-disulfonic acid:

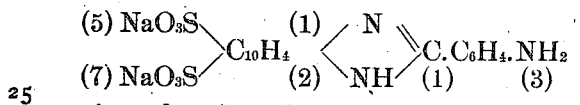

are introduced at about 130° into a mixture of 70 parts of caustic potash and 20 parts of water. The temperature is then gradually raised up to 170° The reaction being finished after about an hour the mass is poured on ice and acidulated by means of hydrochloric acid. On cooling the product of the reaction separates out and is isolated by filtering, washing and drying. Thus is obtained the meta-amidophenyl-1.2-naphthimidazol-5-oxy-7-sulfonic acid:

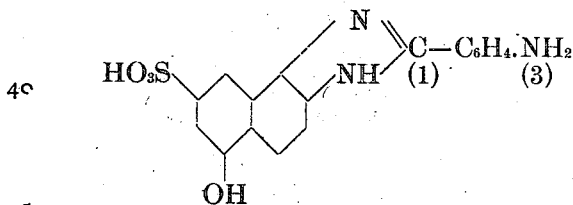

forming a slightly yellowish colored powder, difficultly soluble in water, but easily soluble in alkaline solutions; by acidulating slightly such a solution with a mineral acid, the free sulfonic acid separates, but redissolves when an excess of hydrochloric acid is added.

Of course our present invention is not limited to the above example nor to the details given therein. So for instance instead of the meta-amidophenyl-derivative of naphthimidazol which is used in the foregoing example, the corresponding para-amido-derivative may be employed; the melting operation may also be performed with caustic soda instead of caustic potash.

Having now described our invention and in what manner the same is to be performed what we claim is,—

1. A process for the manufacture of amidooxysulfonic acids of phenyl-1.2-naphthimidazol which process consists in heating with a caustic alkali an amidodisulfonic acid of phenyl-1.2-naphthimidazol of the character defined in the above specification.

2. A process for the manufacture of meta-amidophenyl-1.2-naphthimidazol-5-oxy-7-sulfonic acid which process consists in heating the sodium salt of the meta-amidophenyl-1.2-naphthimidazol-5.7-disulfonic acid with caustic potash up to 170° C.

3. As new articles of manufacture the amidooxysulfonic acids of phenyl-1.2-naphthimidazol:

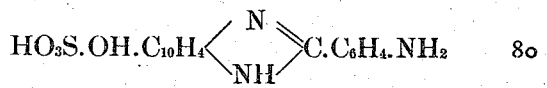

as defined in the above specification which acids are slightly yellowish colored powders, difficultly soluble in water, but easily soluble in alkaline solutions and which acids are precipitated from such a solution by slightly acidulating by means of a mineral acid or of acetic acid, but which precipitate by the addition of an excess of hydrochloric acid is dissolved, and which amidooxysulfonic acids yield when combined in an alkaline solution with diazo-compounds, dyestuffs dyeing cotton without a mordant.

4. As a new article of manufacture the meta-amido-phenyl-1.2-naphthimidazol-5-oxy-7-sulfonic acid is defined in the above specification, which acid is a slightly yellowish colored powder, difficultly soluble in water, but easily soluble in alkaline solution and which acid is precipitated from such a solution by slightly acidulating by means of a mineral acid or of acetic acid, but which precipitate by the addition of an excess of hydrochloric acid is dissolved, and which amidooxysulfonic acid when combined in an alkaline solution with the diazo-compound of anilin, yields a dyestuff dyeing cotton without a mordant a scarlet shade.

In witness whereof we have hereunto signed our name this 28th day of October 1905, in the presence of two subscribing witnesses.

OSCAR SCHULTHESS.
LEO KERKOVIUS.

Witnesses:
 WOLDEMAR HAUPT,
 HENRY HASPER.